United States Patent [19]

Simons

[11] Patent Number: 4,999,172

[45] Date of Patent: Mar. 12, 1991

[54] ABSORBER PACKING AND METHOD

[76] Inventor: Paul B. Simons, 5311 Mockingbird Dr. #13, Anchorage, Ak. 99507

[21] Appl. No.: 390,469

[22] Filed: Aug. 3, 1989

Related U.S. Application Data

[63] Continuation of Ser. No. 212,884, Jun. 29, 1988, abandoned.

[51] Int. Cl.$^5$ .................... C01B 17/16; C01B 31/20
[52] U.S. Cl. .................... 423/226; 423/230; 423/573.1; 423/576.2
[58] Field of Search .................... 423/226, 230, 573.1, 423/576.2

[56] References Cited

U.S. PATENT DOCUMENTS

| | | | |
|---|---|---|---|
| 3,281,307 | 10/1966 | Moeller et al. | 161/68 |
| 3,286,999 | 11/1966 | Takeda | 261/30 |
| 4,537,752 | 8/1985 | Weber | 423/224 |
| 4,541,998 | 9/1985 | Weber | 423/266 |

FOREIGN PATENT DOCUMENTS

| | | |
|---|---|---|
| 833133 | 12/1975 | Belgium . |
| 210175 | 4/1981 | Czechoslovakia . |
| 01500900 | 8/1985 | European Pat. Off. . |
| 3035483 | 4/1981 | Fed. Rep. of Germany . |
| 2498080 | 7/1982 | France . |
| 215474 A1 | 11/1984 | German Democratic Rep. . |
| 226724 A3 | 8/1985 | German Democratic Rep. . |
| 61-200818 | 9/1986 | Japan . |
| 1188736 | 4/1970 | United Kingdom . |
| 1350019 | 4/1974 | United Kingdom . |

OTHER PUBLICATIONS

Bailar et al., University Chemistry, Boston, Massachusetts, 427 (1965).
Linek et al., *Vt. Verfahrenstechnik*, 17, 382 (1983).
Linek et al., *Chem. Eng. Res. Des.*, 62, 13 (1984).
Linek et al., *Chem. Eng. Sci.*, 29, 1955 (1974).
Linek et al., "Scientific Papers of the Prague Institute of Chemical Technology", K 19, 189 (1984).
Strigle, R., "Random Packing and Packed Towers: Design and Applications", Gulf Publishing Co., Houston, Texas, pp. 46–54.

*Primary Examiner*—Gregory A. Heller
*Attorney, Agent, or Firm*—Merchant, Gould, Smith, Edell, Welter & Schmidt

[57] ABSTRACT

A method and arrangement for facilitating removal of hydrogen sulfide from a combuation process gas includes provision of a packed bed scrubber having packing material therein comprising a polymeric substance having an outer surface with a substantially hydrophilic character. For preferred arrangements and methods, the packing material comprises a polymeric substance having a plurality of sulfonic acid groups, or neutralized sulfonic acid groups, thereon. A method of providing such packing material comprises reaction of a substantially hydrophobic packing material with sulfur trioxide. Preferred scrubber arrangements utilizing segmented packing beds are also disclosed. The result of the described methods and processes is a scrubber arrangement having a substantially reduced propensity for plugging, by comparison to conventional scrubber arrangements, when utilized for otherwise conventional scrubbing processes.

4 Claims, 1 Drawing Sheet

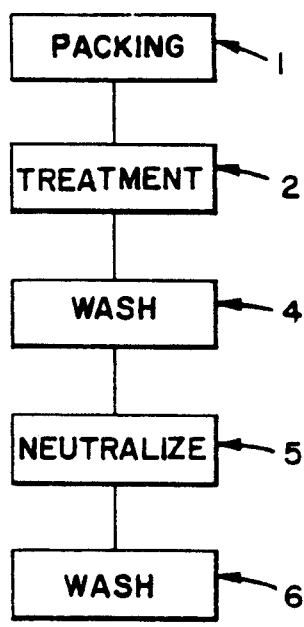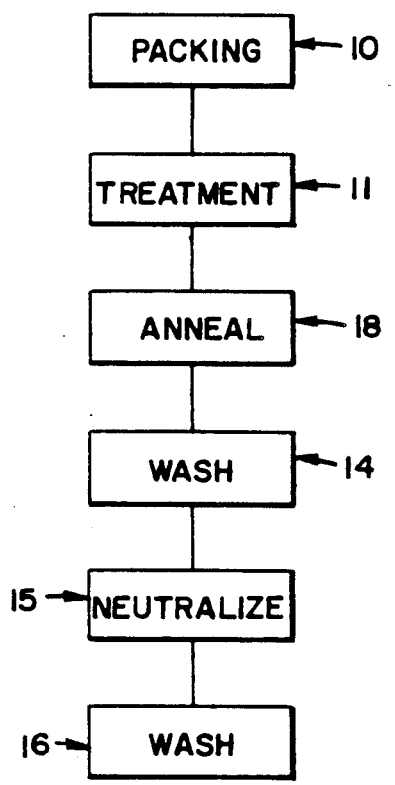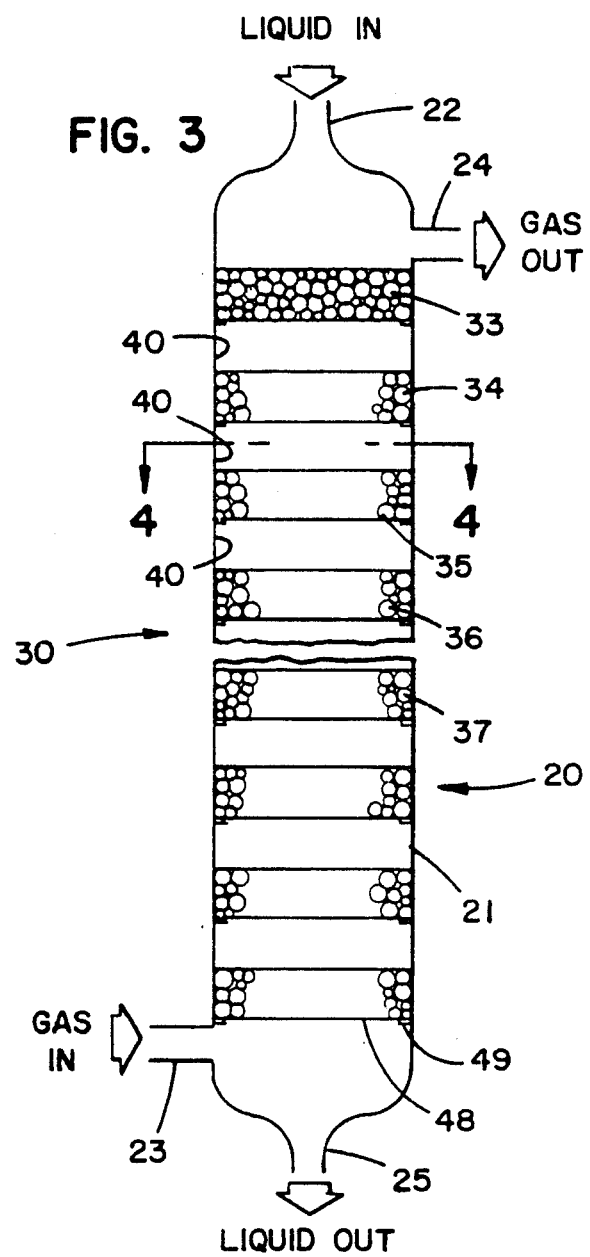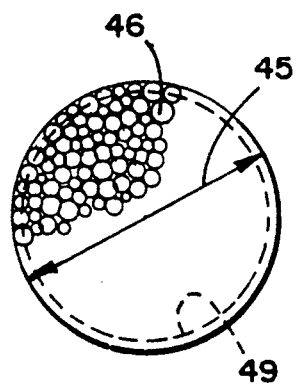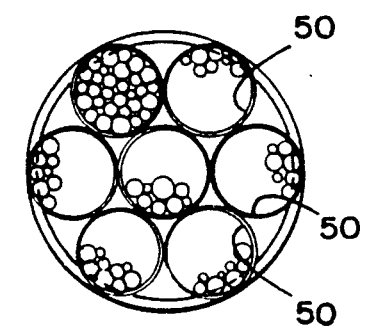

ABSORBER PACKING AND METHOD

This is a continuation, of application Ser. No. 07/212,884, filed on June 29, 1988, now abandoned.

FIELD OF THE INVENTION

The present invention concerns combustion processes, and in particular scrubbing arrangements utilized for the removal of hydrogen sulfide ($H_2S$) in waste gas streams from such processes. In particular, the invention concerns packing arrangements utilized in such scrubbers.

BACKGROUND OF THE INVENTION

During conventional combustion processes, such as coal gasification processes, waste gas streams containing hydrogen sulfide, carbon dioxide and carbon monoxide are generated. Typically, before such a gas stream can be safely discharged to the environment, it is desirable to substantially remove at least the hydrogen sulfide component therefrom.

A variety of processes have been developed for the scrubbing of hydrogen sulfide from waste gas streams. A particularly well-known process is a scrubbing method using a reactive solution, such as the one generally referred to as a Stretford solution. For this process, the waste gas, typically at a temperature of about ambient to 170° F. (20–77° C.), is discharged into an open venturi mixer or scrubber. An alkaline oxidizing solution, for example a Stretford solution, is simultaneously injected into the venturi scrubber, typically at a temperature of ambient to about 120° F. (49° C.). Through absorbtion into, and chemical reaction with, the reactive solution, the hydrogen sulfide generates solid, elemental, sulfur, or other sulfur-containing substances, which can precipitate. A typical Stretford solution is an alkaline solution of sodium carbonate or sodium bicarbonate, containing a Vanadium V oxidation/reduction agent, and anthraquinone disulfonic acid disodium salts. During the chemical reactions, the Vanadium V is reduced to Vanadium IV. It is noted that a variety of alternatives to the Stretford process are well-known. Generally, variations involve substitution of different oxidizing solutions for the Stretford solution. Such process include: the Klaus process; the Sulfolin process; and, the Hyperion process.

Even following a conventional venturi scrubber process using Stretford (or similar) solution, the off gases typically still contain a significant amount of hydrogen sulfide therein, generally on the order of less that 100 to several hundred ppm to above 1000 ppm. Reasons for this may relate, in part, to the fact that in a typical non-packed (i.e. open) venturi scrubber, mixing, i.e., interphasing of the gases and the reacting liquid solution, even when optimized for high yield and preferred flow rate, still is not sufficient to provide 100% or near 100% reaction.

To at least partially accommodate this, the off gases from a typical venturi scrubber are often passed through a second scrubber or absorber. Typically, the second absorber is a packed bed absorber, with counter-current liquid and gas flows. That is, the waste gases, including some hydrogen sulfide therein, are bubbled into the packed bed absorber from one direction, and the reactive oxidizing solution (for example a Stretford solution) is directed through the absorber from an opposite direction. The packing in the absorber generally acts to increase intimate contact of the gas and liquid phases, and thus facilitates reaction.

For a typical industrial process, the packing material comprises pieces of materials such as metals, plastics, ceramics, wood, etc. A typical packed bed scrubber or absorber, for many commercial processes, comprises a very large column, for example a column on the order of about 20 ft. high, and 3 ft. or so in diameter.

A source of continual problems for industries utilizing combustion processes has been the fact that packed bed scrubbers readily plug during scrubbing processes. That is, elemental sulfur, sodium sulfates and other solid materials form during reactions in the packed bed scrubber. Generally, the solids form at the packing surface, and relatively rapidly plug the absorber, to inhibit the flow of fluids therethrough. Thus, in some instances even after only a few days of use, a packed bed scrubber must be taken off line and reconditioned or recharged.

Typical methods of reconditioning packed columns include: replacement of the packing material; or, a cleansing of the packing material in a manner generally dissolving the plugging material, for example upon aggressive washing with a strong, hot, highly caustic solution such as a sodium hydroxide solution or the like.

The problem of relatively rapidly plugging packed absorbers is significant. First, the off time for the absorber can be substantial, inconvenient, and/or in violation of governmental permits. Back pressures can be inconvenient or hazardous, if not appropriately controlled. Further, commonly used, typically highly caustic, cleansing solutions may limit packing life and may otherwise damage, in time, the absorber unit involved. Further, large amounts of highly caustic washing solution create a substantial cost, and also a waste disposal problem.

Replacement of packing is also undesirable. It is, for example, time consuming, expensive, potentially hazardous and inconvenient. Also, frequent disturbance of bed packing can inhibit good column operation.

Those involved in industries using combustion processes have attempted to alleviate the column-plugging problem by trying various sizes and shapes of packing material. For more exotic-shaped packing materials, plastics have been used, since plastics are readily formable into a variety of shapes, at a relatively low cost. In general, approaches to the above-related packed scrubber problem, involving use of various packing shapes, have been either ineffective, or not of substantial benefit in leading to a significant alleviation of the problems.

What has been needed has been a method applicable to yield a packed bed scrubber unit, with a reduced tendency toward plugging during operation. Packed bed arrangements facilitating reduced plugging and regeneration of packing have also been needed.

OBJECTS OF THE INVENTION

The objects of the present invention include: a method of treating packing for a packed bed scrubber, which leads to a substantial reduction in a likelihood of plugging during use; a packing material exhibiting a reduced tendency to become plugged; a preferred packing material generated by treatment according to the method; a preferred arrangement of packing material within an absorber, which arrangement leads to a reduced likelihood for plugging during use; a preferred such arrangement which utilizes packing material having a reduced tendency to become plugged; a particular preferred arrangement which utilizes packing material treated according to a method of the invention; a method, packing material and arrangement which are relatively easy to obtain or effect; a packing material and arrangement which are relatively inexpensive to produce; and, a packing material and arrangement which are particularly well-adapted for the proposed usages thereof. Other objects and advantages of the present invention will become apparent from the following descriptions, taken in connection with the accompanying drawings, wherein and set forth by way of illustration and example certain embodiments of the present invention.

SUMMARY OF THE INVENTION

The present invention stems, in part, from certain observations made with respect to conventional packed bed scrubbers. In particular, polypropylene plastics and similar materials have been utilized as packing materials for some packed bed scrubbers. Such materials present a generally hydrophobic surface to the environment. That is, the outer surfaces of such materials generally comprise environments containing a high percentage of non-polar carbon-carbon (C—C) and carbon-hydrogen (C—H) bonds. The solid materials, i.e. elemental sulfur, sodium sulfates and sodium bicarbonate salts etc., generated in the packed bed scrubber form a good adherence to such materials. That is, they can be very difficult to shake loose from hydrophobic surfaces, without use of substantial amounts of hot, caustic, solvents to partially dissolve them. In general, it is suggested herein that plugging is less likely if the packing material can be provided with a hydrophilic outer surface to which the solids would not as tightly adhere and from which they can be more easily washed. When this occurs, the solids are more likely to be dislodged or bumped off the packing material and flushed outwardly from the absorber, in the liquid oxidizing solution, as the liquid is washed through the column. That is, solids build-up on the packing occurs much more slowly, with the plugging being delayed substantially.

It will be understood that the present invention is not to be limited to any particular theory about absorption on the packing material; rather, it generally concerns the phenomena that more hydrophilic surfaces are more easily scrubbed clean of solids forming during scrubbing, and are less likely to become plugged.

In general, according to the present invention a packing material is provided which has a substantially hydrophilic outer surface. For a typical application of the present invention, the packing material comprises a treated hydrophobic plastic surface, converted by a preferred method of treatment to generate a substantially hydrophilic outer surface. Examples of plastic material which may be treated according to the present invention for generation of a hydrophilic outer surface include polypropylene, polyacrylonitrile, polyvinyl chloride, polyether, polysulfone and polyethylene plastics, and/or generally any other plastic which has carbon-hydrogen bonds in relative abundance.

To convert a hydrophobic surface and obtain a hydrophilic surface, according to a preferred application of the present invention, a plastic material having an outer surface comprising mainly carbon-hydrogen bonds is treated such that a substantial portion of the surface is converted to sulfonic acid groups, i.e. —C—SO$_3$—X groups, wherein X is preferably H, or a metal cation. Herein, the term "—C—SO$_3$—X" is meant to refer to a sulfonic acid group functionalized organic material, regardless of the remainder of the substituents on the carbon which is functionalized. It will be understood that X may be a variety of metal cations including sodium, lithium and potassium ions.

Alternatively, hydrophilic surfaces may be generated by, for example, treatment of the polymer with a chromic acid bath, to generate carboxylic acid groups at the outer surface; or, through use of reactive polymer such as vinyl benzyl chloride in the original polymerizations i.e. a copolymer or terpolymer of styrene/vinyl benzyl chloride/styrene, styrene/benzyl chloride/acrylonitrile or acrylate ester/vinyl benzyl chloride. These latter types of polymers can be readily treated to give hydrophilic, cationic, outer surfaces, for example by reaction with ammonia to form ammonium chloride salts, or with an organic amine or substituted amine, to form an analogous salt.

Sulfonation of the outer surface of the plastic may be accomplished in a variety of manners. A typical, convenient, manner is to treat the surface with the equivalent of sulfur trioxide, SO$_3$. This can be accomplished, for example, through utilization of pyrosulfuric acid (67% H$_2$S$_2$O$_7$) According to one method, nitrogen gas is bubbled through a pyrosulfuric acid solution, to pick up SO$_3$. The gas, carrying the SO$_3$, is then swept through a vessel containing the polymeric packing material to be treated. In some applications pure SO$_3$, without a diluting gas may be used. Alternatively, the polymeric scrubber material could be rinsed with, or submerged with, an appropriate pyrosulfuric acid solution, or other source of sulfonating-reagent.

It will be understood that the sulfonation treatment may be effected on either aliphatic or aromatic polymers. Generally, aliphatic polymers will be preferred, since the sulfonation reaction on some aromatics may be reversible.

It is observed that when the above process is utilized on polypropylene, a large amount of black material forms on a polypropylene surface. Much of the black material sloughs off, or washes off, readily. When this occurs, some of the newly-created hydrophilic character at the plastic surface is lost.

While such treated polypropylene material is still usable with obtained advantages, according to the present invention, it would be preferred to realize a material which loses less of its hydrophilic character, through sloughing. It has been found that, in general, when the sulfonated material is heat treated, typically upon heating to about 70° C.–130° C. for 30 minutes or so, a higher percentage of the black material is retained on the surface of the plastic.

While it is not intended that the present application be limited to any particular theory or speculation, it is speculated that the black material, which can readily slough off polypropylene, results from the residue of terminal methyl groups that have been sulfonated at two or three positions, or low molecular weight sulfonated materials. Further, it is speculated that the heat treatment tends to anneal the plastic polymer, limiting the cleavage of such terminal multiply-substituted methyl groups or low molecular weight sulfonated materials.

In general, the follow-up heat treatment should be as high as reasonably possible without leading to substantial melting or destruction of the plastic material treated. Heat treatment may be conducted in the presence of air, and thus can be conveniently effected.

In general, and while it is not required, it is preferred to provide packing material according to the present invention which has a generally neutral, i.e. nonacidic, outer surface. This can be readily accomplished by treating the plastic material, after sulfonation, with a base, for neutralization. In typical applications according to the present invention, treated plastic materials are washed in a 1.0–10.0% neutralizing solution, such as a sodium hydroxide solution, for from about 1 minute to 1 hour. The sodium hydroxide solution will generally neutralize the acid groups, i.e. convert them to the sodium salt. Such neutralized materials are then readily usable as absorber packings.

When plastic absorber materials, treated as above-described, are utilized in conventional packed absorber systems, there is a substantial decrease in plugging or the rate of plugging. That is, the absorber can be used over a substantially longer period of time, without significant plugging.

Treated packing materials according to the present invention, then, have at least two advantages. First, plugging is more slowly developed and/or less likely to occur since the packing materials present a substantially hydrophilic outer surface to the elemental sulfur, and various salts, forming thereat. The salts are observed to be less likely to adhere to the packing surface, and are more likely to be flushed through the column, in the liquid phase.

Also, if some plugging or absorbing does eventually occur, the material can be more easily and readily cleaned off, since it does not appear to form as significant or strong an adherence to the packing material surface. That is, it can be readily dislodged, for example by a combination of washing and mechanical means such as bumping off the packing material.

A dislodge or bump procedure effecting a removal of solid material from packing treated according to the present invention may, for example, involve the following steps:

1. First, the rate of liquid flow through the packed column is increased substantially, the liquid discharge is decreased substantially, and the gas flow is stopped momentarily. This allows the unit to partially flood.

2. Then, with a drain of the system partially closed, the system is pumped full of gas, agitating the packing material. Agitation of the packing material comprises causing the packing pieces to bump into one another, and into sidewalls of the column. The bumping dislodges loosely adhered solids fairly effectively.

3. As a final step, the drain to the system is opened fully and, the flood of excess liquid is allowed to escape therefrom, carrying therewith materials dislodged from the packing surface.

In general, the above-described steps of bumping packing materials are known, for packing materials not having a treated, hydrophilic, outer surface according to the present invention. This bumping procedure, however, in the past has been of limited use since solid materials in the packing were often tightly adhered thereto. The bumping procedure, it will be understood, is significantly enhanced by a process, according to the present invention, of providing packing material with a relatively hydrophilic outer surface.

As previously indicated, conventional packed absorber arrangements are generally vertical columns deeply packed with packing material. The gases from a combustion process, including hydrogen sulfide therein, are typically directed into the column through a bottom and are directed upwardly therethrough to an outlet. The treatment solution is generally provided as a counter-current flow, from the top of the arrangement through toward the bottom.

When treated packing material according to the present invention is utilized in such an arrangement, it has been experimentally observed that relatively little, if any, significant deposit of solid material occurs in a top fraction, typically about 9 to 12 inches (22–30 cm) of packing material. That is, little solid buildup occurs in the portion of the packing material closest to the liquid input. It may be speculated that a reason for this is that the input force, or agitating effect, of the liquid phase, in these regions, is sufficiently strong to dislodge most solid material forming in this region, from the outer surfaces of the packing material.

It has also been observed, however, that underneath this upper, clean, fraction, comprising 9 to 12 inch (22–30 cm) layer of relatively solid free material, a band of solid buildup, i.e. plugging buildup, does occur. It is reasonable to conclude that this buildup begins to occur at a point sufficiently deep in the packing material bed that liquid flow and/or volume of liquid passing over any selected area of packing has been effected by the packing such that it is not able to generate sufficient agitation at the packing surface, to dislodge the solids. That is, the solids could be relatively readily washed off of the packing material surface, if a substantial amount and/or force of liquid flow per unit area could be brought into association with the packing.

As a result of the above observations, a preferred arrangement for a packed absorber column according to the present invention has been developed. In particular, preferred absorber beds are separated into spaced sections, each section including a bed of packing material therein; and, each section being spaced by sufficient open distance to allow liquid passing therebetween to recollect somewhat and gain sufficient velocity and/or momentum to substantially impact and wash off a next lower segment. For example, each segment could be about 6 to 24 inches (15–61 cm) deep, separated by about a 6–24 inch (15–61 cm) free-fall space for the downwardly passing liquid. Preferably, each segment is about 6 to 9 inches (15–22 cm) with 6–9 inch (15–22 cm) spacing therebetween. Each segment, then, would generally operate as does an upper 6 to 9 inch (15–22 cm) layer of a deeper, more conventional, column bed, which would not receive a substantial buildup of solid sulfur-containing material therein. This will be described in further detail, below.

It will be understood that advantages could be obtained from a segmented absorber, according to the present invention, even in the absence of packing material having a hydrophilic surface formed by a treatment as above-described. That is, conventional absorber arrangements could be improved, through generation therein of spaced segments of absorber material. However, the segmented system is augmented considerably, by use in association therewith of a generally hydrophilic, and therefore relatively easily cleaned, packing outer surface.

In further improvements, each segment may be isolated into a plurality of laterally spaced compartments, separated by one another. Such an arrangement facilitates the bumping processes, particularly if each compartment is associated with means whereby it can be individually bumped. Further, such an arrangement facilitates maintenance of a relatively even layer of packing material, i.e. an even cross-section or depth, across the width of the absorber. This will be more apparent from the following descriptions.

The drawings constitute part of this specification, and illustrate exemplary embodiments of the present invention, which may be embodied in various forms. It is to be understood that in some instances relative material thicknesses, and relative component sizes, may be illustrated exaggerated, to facilitate an understanding of the invention.

BRIEF DESCRIPTION OF THE DRAWINGS

FIG. 1 is a schematic flow-chart outlining steps of treating packing material according to the present invention, to generate a preferred absorber packing material.

FIG. 2 is a schematic representation of a procedure, including an advantageous annealing step, relative to that of FIG. 1.

FIG. 3 is a schematic representation of a packed bed scrubber including packing therein distributed according to a preferred application of the present invention.

FIG. 4 is a schematic cross-sectional view taken generally along line 4—4, FIG. 3.

FIG. 5 is a schematic cross-sectional view generally analogous to that of FIG. 4, but showing an alternate arrangement.

DETAILED DESCRIPTION OF THE INVENTION

As required, detailed descriptions of the present invention are presented herein. It is to be understood, however, that the disclosed embodiments are merely exemplary of the invention, which may be embodied in various forms. Therefore, specific structural, functional and procedural details disclosed herein are not be interpreted as limiting, but rather as a basis for the claims and a representative basis for teaching one skilled in the art to variously employ the present invention in virtually any appropriately detailed system or manner.

Preferred Packing Material

According to certain aspects of preferred embodiments of the present invention, an advantageous packing material is provided for use in a packed bed scrubber. In a typical packed bed scrubber, a column of packing material is provided in a vertical through-flow arrangement. Generally, a combustion process gas, including hydrogen sulfide to be scrubbed therefrom, is fed into the column arrangement from a bottom, and is bubbled outwardly from the top. A liquid solution, such as a Stretford solution, is typically fed into the column counter-current to the gas flow, i.e. from the top downwardly. Chemical reactions within the packed bed scrubber, between the gas phase and the liquid phase, generally result in formation of solid materials within the absorber. In particular, elemental sulfur is formed, as well as sodium sulfate materials. This leads to the removal of much of the sulfur from the combustion process gases. Surfaces of the packing material facilitate liquid/gas interactions, and thus the chemical reactions.

In many conventional arrangements, plastic packing materials having a generally hydrophobic outer surface have been used. Elemental sulfur, sulfur-containing salts and other solids formed during scrubbing readily and tightly adhere to such surfaces. According to the present invention, the packing materials for packed absorbers are provided with a substantially hydrophilic outer surface. The absorber may then be utilized in an otherwise conventional manner, or in preferred manners as described herein. As a result of providing a packing material having a relatively hydrophilic outer surface, overall performance is enhanced, since solid sulfur-containing compounds formed during scrubbing do not as readily or tightly adhere to the packing materials.

In a typical application of the present invention, a hydrophilic packing material is prepared from a conventional hydrophobic packing material. A typical packing material utilized according to the present invention comprises a polymeric plastic material. Generally, aliphatic polymers are preferred, as sulfonation reactions which lead to the preferred hydrophilic surfaces, as described herein, are generally irreversible with respect thereto. That is, aromatic sulfonations are generally reversible reactions and therefore less desirable for treatment of packing surfaces according to the present invention.

Hydrophobic polymer surfaces in conventional plastic materials generally comprise surfaces having a high percentage of carbon-hydrogen bonds thereat. Sulfur-containing substances appear to readily and tightly adhere to such surfaces. According to the present invention, a substantial portion of the carbon-hydrogen bonds at the surface are converted to hydrophilic arrangements, in particular $-C-SO_3-X$ arrangements; wherein X comprises hydrogen or a cation such as a sodium or potassium ion. That is, for preferred plastics a substantial amount of sulfonic acid groups are provided at the polymer outer surface, the acid groups either being active or neutralized.

A variety of aliphatic plastic materials may be converted to preferred packing materials according to the present invention. These plastic materials include polypropylene plastics, polyethylene plastics, polyvinyl chloride plastics or the like. Preferred polymers, again, are those which comprise a preponderance of carbon-hydrogen bonds at an outer surface, since it is such bonds that can be readily converted, upon treatment as described below, to sulfonic acids moieties.

A variety of methods may be utilized to convert a substantial amount of the surface carbon-hydrogen bond of plastic packing materials, to hydrophilic moieties, preferably to $C-SO_3-X$ groups as above-described. Generally, treatments with highly reactive sulfur trioxide ($SO_3$) readily accomplish this.

One convenient source of $SO_3$ is pyrosulfuric acid (65% $H_2S_2O_7$). Nitrogen gas may be bubbled through a pyrosulfuric acid solution, to pick up $SO_3$ therein. The $SO_3$-carrying nitrogen gas stream can then be directed into a container having plastic packing material to be treated therein. Under these conditions, a rapid sulfonation reaction will occur at the surface of the packing, to generate sulfonic acid groups thereat. Also, pure sulfur trioxide gas could be used. In the alternative, the packing material could be submerged in a sulfonating solution of pyrosulfuric acid or the like.

Following treatments to generate sulfonic acid moieties on a surface thereof, the packing material should, in general, be washed for removal of excess acid (if liquid $H_2S_2O_7$ were used rather than the gaseous approach to reaction). Preferably, the remaining sulfonic acid groups are neutralized, for example through washing with a sodium hydroxide solution or the like, to provide a substantially neutral polymer outer surface. This can be accomplished, for example, by agitating the treated packing in a 1.0–10.0% sodium hydroxide solution, at room temperature, for about one minute to one hour. After the dunking process, generally a water wash will be preferred to remove excess base from the polymer outer surface.

With some polymers, it may be desirable to provide a heat treatment between the sulfonation and washing steps. The heat treatment can be used to anneal the polymer outer surface, inhibiting sloughing off of sulfurated materials. This will be a particularly desirable process for use with polypropylene materials. The term "anneal", and variants thereof as used herein, is meant to refer to heat treatment of plastic or polymeric material, to result in less sloughing, and is not meant to refer to any particular chemical or physical process taking place.

In FIGS. 1 and 2, the above general schemes are illustrated. Referring to FIG. 1, the reference numeral 1 generally designates a step of providing packing material for use in treatment according to the present invention. The packing material may comprise any variety of hydrophobically-surfaced polymeric materials including aliphatic materials such as polypropylene and polyethylene. The materials may be formed in a variety of shapes and sizes. Generally, the packing material for preferred applications of the present invention comprises a plastic formed into, or cut into, pieces having a diameter, or width, of about 1 to 5 inches (2.5–13 cm). For particularly preferred applications the plastic pieces comprise plastic spheroids, having large apertures therein; that is, the pieces have a ribbed spheroidal structure formed from about 4 to 8 longitudinal ribs, and a singular, central, equatorial, circumferential rib.

The reference numeral 2, FIG. 1, generally represents a step of treating the packing material, provided in step 1, to generate a substantially hydrophilic outer surface. Preferably the step comprises formation of sulfonic acid groups thereat, most preferably by reaction with $SO_3$. In general, this may be provided, as above-described, with pyrosulfuric acid. The reaction is relatively rapid, even at room temperature, and results in conversion of a substantial amount of carbon-hydrogen bonds at the polymer outer surface to carbon—$SO_3$—H moieties. That is, the "net effect" is an insertion of $SO_3$ into the carbon-hydrogen bonds, to provide formation of sulfonic acid groups, although a variety of mechanisms are possible. By the designation that a "substantial" amount of carbonhydrogen bonds are converted, it is meant that the overall nature of the polymer outer surface is converted from a substantially hydrophobic character to a substantially hydrophilic character. In general, the greater the percent of reaction, the greater will be the hydrophilic nature of the outer surface, and thus the more effective the treated packing material will be in resisting sulfur adherence thereto.

If immersion in pyrosulfuric acid is used, then washing to remove excess acid may be desired. If gaseous $SO_3$ were used, the washing step may be unnecessary. Still referring to FIG. 1, reference numeral 4 indicates an optional step of washing the treated material from step 2, for the removal of excess of reagents, sulfuric acid or other materials from the outer surface thereof. In general, the washing of step 4 can be accomplished in a variety of manners, for example through a rinse with water.

The material from step 4, (if a washing step were used, otherwise from step 3) when the process involves sulfonation, has a relatively acidic, hydrophilic, outer surface. For many applications it will be preferred to provide a substantially neutral outer surface. In FIG. 1, this is illustrated as accomplished by a follow-up neutralization step 5. Neutralization may be conducted, for example, by dunking the material from step 4 into a sodium hydroxide bath, or the like, as above described. Alternatively, gaseous ammonia can be used to neutralize. Generally, following steps of neutralization, a final washing step 6 may be preferred, for example to remove excess sodium hydroxide from an outer surface of the treated material. As a result of following the general scheme of FIG. 1, overall hydrophilic-surfaced plastic material is formed, which can be utilized as a preferred packing material in packed absorbers or scrubbers, according to the present invention.

In FIG. 2, an alternate scheme to that illustrated in FIG. 1 is shown. FIG. 2 is in many ways similar to FIG. 1. That is, steps of: providing packing 10; reagent treatment to provide a hydrophilic surface 11; washing 14; neutralizing 15; and final washing 16 are shown. Again, it is noted that the washing step 14 may not be needed if gaseous $SO_3$ is used.

The manner in which the scheme of FIG. 2 differs from FIG. 1, is that there is a heat treatment, indicated at reference numeral 18, immediately following the $SO_3$ treatment step 11. The heat treatment is generally conducted to anneal the outer surface of treated polymer, to inhibit sloughing off of material, presumably highly functionalized moieties, as previously described. Generally the heat treatment step may be conducted at about 70° to 130° C., within about 30 minutes, and even with exposure to air, for typical plastics such as polypropylene materials. The amount of, temperature of, and need for, annealing will depend, in general, upon the nature of the polymer being treated. Polymers such as polypropylene which have terminal groups that become highly functionalized during the sulfonation step 11, generally appear to particularly need the annealing, to prevent substantial sloughing off of functionalized moieties. Preferably annealing is conducted at a temperature lower than will unacceptably soften the polymer, but sufficiently high to be effective in retaining functionalized groups in the polymer. The conditions stated above, it will be understood, are not absolute, but rather are generally effective for the annealing of typical polypropylene compounds.

Treated packing materials according to the present invention may be utilized in a conventional scrubber arrangement, with the beneficial results discussed above. That is, generally, in use, scrubbers packed with such materials have less of a propensity to become plugged. However, it is noted that in time some plugging may occur. When this does occur, such materials can be relatively readily cleaned of solid sulfur-containing material on an outer surface thereof, since the solid material can typically be readily rubbed off, bumped off or washed off of the outer surface. That is, highly caustic base solutions, to dissolve the deposited solid materials, are typically not required.

Preferred Scrubber Packing

Also according to the present invention a preferred arrangement for the placement of packing material in a packed bed scrubber or absorber. Advantages from the arrangement are particularly well-defined, when utilized in association with preferred, treated, packing material according to the present invention. However, it will be understood that advantages can be obtained from the arrangement, even when utilized with conventional packing materials.

The preferred arrangement is illustrated, schematically, in FIG. 3. Referring to FIG. 3, a packed bed scrubber 20 is depicted. The scrubber 20 comprises a casing 21, generally vertically positioned, with an upper liquid inlet 22 and a lower gas inlet 23. The arrangement is also illustrated with an upper gas takeoff 24, and lower liquid take off 25.

The arrangement depicted in FIG. 3 is intended to be schematic and representational only. Such a device may include, for example, a plurality of inlets, outlets and valving arrangements, for operation. However, in general vertical arrangements having packing material therein are provided, through which combustion gases including $H_2S$ are fed to flow upwardly from the bottom, and into which liquid solutions for reaction with the gas, to form elemental sulfur, and sulfur salts, are fed inwardly from the top, and allowed to flow downwardly, counter-current to the gas flow. Packing material within the absorber generally provide for substantial gas/liquid interactions, and thus a high degree of reaction.

According to the present invention, packing material is provided in the bed area 30 of the scrubber 20, in a preferred segmented arrangement. In particular, referring to FIG. 3, reference numerals 33, 34, 35, 36 and 37 generally designate selected segments of packing material, separated vertically by open spaces 40. In general, each segment, 33 through 37, is provided as deep as can be readily cleansed, of plugging solids, by downward flow of the liquid. For preferred arrangements, especially those comprising packing material with hydrophilic outer surfaces according to the present invention, each of the segments; for example segments 33 through 37 should be about 6 to 24 inches (15-61 cm), preferably 6—9 inches (15-22 cm) deep. For typical scrubbers, segments of about such depths can be readily washed clean of solids formed therein, by the liquid flow. If the segments were much thicker or deeper, the liquid flow would generally not have sufficient velocity or momentum per surface area of encountered packing, for a good abrasive or washing effect in causing substantial cleansing of the material.

Generally, the vertical spaces 40 should also be on the order of about 6 to 24 inches (15-61 cm) deep, and preferably about ⅛ to ⅓ of the packing depth. Due to such gaps, solution falling downwardly between segments will generally obtain sufficient velocity and/or momentum during the fall, to provide a good abrasive, cleansing, impact with the next lower segment. Thus, according to the present invention, a segmented arrangement is provided which is less likely to plug, by comparison to overall substantially continuous bed arrangements of the conventional art. It will, again, be understood that advantages can be obtained from such an arrangement even with conventional packing.

In FIG. 4 a cross-sectional view taken generally along line 4—4, FIG. 3 is presented. A diameter of the scrubber is indicated generally at line 45. Packing material is indicated at 46. A purpose of FIG. 4 is to indicate that there is an overall upper surface, at the top of each segment 33, 34, 35, 36 and 37. Preferably the packing material is arranged such that it is kept relatively evenly distributed throughout the upper surface of the packing. A porous or open framework 48, FIG. 3, not detailed, positioned under or in association with each of segments 33 through 37, can be used to support the packing and to ensure segment separation. Still referring to FIG. 3, the framework 48 is shown mounted on a lip or ledge 49.

In a variation of the arrangement according to the present invention, FIG. 5, each segment, for example segment 34 depicted, is separated into a plurality of smaller sections 50; each of the smaller sections 50 comprising a generally vertically aligned segment filled with packing material and having sidewalls preventing packing material from adjacent segments from mixing. Utilization of such an isolated vertical segment arrangement facilitates even distribution, i.e. depth, of packing material within each given segment, for example segment 34. Means may be provided, not detailed, permitting each of sections 50 to be independently bumped according to a bumping procedure such as that previously described, or cleaned.

The following experiments illustrate the above described principles.

EXPERIMENT 1

PREPARATION OF PACKING HAVING A HYDROPHILIC SURFACE

A sufficient quantity of one inch polypropylene packing was placed in a 4 liter glass vacuum filter flask, fitted with a rubber stopper containing a glass tube extending to the bottom of the vessel. A sulfur trioxide generator was constructed from a gas sparging bottle containing a fritted glass disk. Nitrogen was passed through a quantity of pyrosulfuric acid (65% oleum) and the mixed gases were passed into the filtration flask (sulfonation reactor). The gas flow was continued until the surface of the plastic was a more or less uniform black color. The gas flow was then stopped, and the reactor vessel was allowed to stand for about 10 minutes. The plastic packing was transferred to a 4 liter beaker, and the beaker and packing were placed in an oven at about 90° C. The material remained in the oven for about 30 minutes to one hours. After removing the packing from the oven, it was allowed to cool to room temperature and was then washed with a dilute solution of sodium hydroxide. After drying, the packing was ready for use.

The related procedure was also used with 20% glass fiber filled polypropylene packing. When this was done, the heat treatment was carried out at about 120° C.

In an alternate procedure, a commercial sulfonation apparatus was used, and neutralization was conducted with ammonia prior to removal from the apparatus.

EXPERIMENT 2

ADHERENCE SULFUR PARTICLES TO THE SURFACES

Treated plastic pieces made according to the first described procedure of Experiment 1 were put into a glass tube (1 inch diameter about 8 inches long). A one gallon sample of a regenerated Stretford solution (known to contain solid sulfur particles), was passed over the material repeatedly, and the plastic was examined for accumulated solids. A similar experiment was conducted using untreated plastic. By visual examination, considerably less solid was accumulated on the plastic surfaces of the treated plastic material.

EXPERIMENT 3
FURTHER TESTS FOR ACCUMULATION OF SOLIDS

One inch diameter PVC pipe was cut into slices of about ¼ to ½ inch wide and then quartered. One portion was retained as a control, and the remainder was treated according to the first described process of Experiment 1.

The procedure of Experiment 2 was repeated with treatment over a longer period of time and replacement of the Stretford solution every day or two. Comparison of the treated material to the untreated control, again led to an observation that considerably less sulfur material was adhered to the treated plastic materials.

EXPERIMENT 4
CIRCULATING REGENERATED STRETFORD SOLUTION

Two absorbers were made using two inch diameter by 18 inch diameter tubes. The absorbers were configured so that fresh, regenerated Stretford solution passed through the units and was discharged into the system. The units were modified after a few experiments, to provide two drain lines rather than one, due to plugging of the drain lines with solid matter that was observed.

Each unit was filled with packing material treated according to the first described procedure of Experiment 1. It was observed that the solid matter which did accumulate on the treated packing was readily removed by washing in situ or externally with water. In general, for both treated and untreated packing, reduced flow rates did correlate with an increased build up in solid material. The solid build ups tended to start at the packing/ container wall interface, spreading toward the center of the arrangement. When significant solids build up was observed in the test unit, there seemed to be more material in the bottom ⅓ of the column than the upper ⅔. Significant increases in the rate of liquid flow tended to dislodge particles from the treated surfaces to which they had become attached. This was not observed for the untreated material, to any great extent.

It is to be understood that while certain embodiments of the present invention have been illustrated and described, the invention is not be limited to the specific forms, methods or arrangement of parts herein described and shown.

EXPERIMENT 5
PERFORMANCE COMPARISON OF TREATED VS. UNTREATED PACKING

The glass absorber used in this experiment had a 6 inch diameter and was 6 feet in height. All internal parts of the absorber, including the packing and the packing support device, were made of plastic. The packing used in the experiment was of an open spherical type made of polypropylene, with a one inch diameter. The packing was placed in the absorber in a segmented bed arrangement with each of 6 bed segments having a 6 inch depth and being spaced 6 inches from adjacent packing segments. The packing support plate used had suitable openings and was made of ultra-high weight polyethylene. Three support rods also of ultra-high molecular weight polyethylene were equally spaced around the packing support plate.

During this experiment sulfolin solution entered the top of the absorber at a flow rat of 4 gallons, flowing down the column counter-currently to a sour gas stream with composition 0.7-1.3% $H_2S$ and 95+% $CO_2$ flowing at 12-15 standard cubic feet per minute. Gas with such a high $H_2S$ content was used rather than more typical venturi treated gases containing 0.1-0.35% $H_2S$ in an effort to accelerate the experiment.

The packing described above was first utilized in the absorber without any further treatment, thus retaining its hydrophobic character. Exposure of the untreated, hydrophobic packing to the sulfolin solution and sour gas at the flow rates stated caused the column pressure drop to reach an inoperable level of about 30 inches of water (i.e. the column was completely plugged) after 185 hours of operation.

The experiment was then repeated with identical flow rates of sulfolin solution and sour gas but utilizing packing treated to give it hydrophilic character. The packing was treated by placing it in a heavy-walled polyethylene bag fitted with a valve at the closed end and exposing the packing to gaseous sulfur trioxide diluted with nitrogen obtained by passing a stream of nitrogen into a gas sparger vessel containing pyrosulfuric acid $H_2S_2O_7$. After a uniform black color became evident on the packing it was heat-treated at about 80°-90° C. for about one hour. The packing was then allowed to cool, was immersed in a 10% sodium hydroxide solution, and was agitated in the solution for about 10 minutes. After removal from the solution, the packing was rinsed with distilled water and dried before placing it in the absorber.

The treated packing was then exposed to sulfolin solution and sour gas exactly as the untreated packing had been. Column pressure drop reached inoperable levels at 344 hours, with the dislodge or "bump" technique (as described in the specification at page 9) applied beginning at 272 hours and repeated. Even at the time of termination of the experiment (344 hours), operation of the absorber packed with hydrophilic material was fully acceptable.

EXPERIMENT 6
REVISED OPERATING PROCEDURE

The absorber and packing preparations followed in this experiment were identical to that of Experiment 5; however, a revised absorber operating procedure was followed in an effort to increase the length of successful operation of the absorber prior to its reaching a column pressure drop of 30 inches of water. This amount of pressure drop was indicative of excessive solids accumulation in the column, or a plugged condition.

The revised operating procedures included feeding sulfolin solution and sour gas to the absorber at identical flow rates as in Experiment 5, but with an added step of periodically stopping the inlet flow of solution and gas in order to clean out the liquid drain line at the bottom of the column. Simultaneously the sour gas inlet line was checked and any obstructions in the line were removed.

The revised operating procedure was applied to a column packed with treated (hydrophilic) packing, and also one packed with untreated material, just as described in Experiment 5. The untreated packing required application of the dislodge or bumping technique after about 93 hours of operation, and operation with the untreated packing became impossible after about 362 hours despite bumping. The treated packing, however, did not require bumping until about 704 hours of operation, and the absorber packed with treated packing operated successfully for about 1140 hours with bumping repeated periodically.

It is to be understood that while specific examples have been described and shown, the invention is not to be limited, except by the following claims.

What is claimed and desired to be secured by letters patent is as follows:

1. A method of removing hydrogen sulfide from a combustion process gas; said method comprising the steps of:
    (a) providing a packed bed scrubber having packing material therein; said packing material comprising a polymeruic substance having a substantially hydrophilic outer surface;
    (b) passing as process gas to be treated through said packed bed scrubber; and,
    (c) passing an oxidizing reactant solution through said packed bed scrubber.

2. A method according to claim 1 wherein;
    (a) said packing material has a substantially hydrophilic outer surface and is characterized by having thereon a substantial density of groups according to the general formula: —C—SO$_3$—X; wherein X is selected from the group comprising hydrogen and metal cations.

3. A method according to claim 1 wherein said step of providing packing material includes:
    (a) providing a hydrophobic polymeric packing material; and,
    (b) reacting said packing material with a sulfonating agent to generate a substantial density of sulfonic acid groups on an outer surface thereof.

4. A method according to claim 3 wherein said step of reacting said packing material includes reacting same with SO$_3$.

* * * * *